US011754375B1

(12) United States Patent
Zalar et al.

(10) Patent No.: US 11,754,375 B1
(45) Date of Patent: Sep. 12, 2023

(54) APPARATUSES AND WEARABLE ARMOR SYSTEMS INCLUDING ELECTRICAL SOURCES

(71) Applicant: Cornerstone Research Group, Inc., Miamisburg, OH (US)

(72) Inventors: Frank M. Zalar, Beavercreek Township, OH (US); Matthew S. Benefiel, Xenia, OH (US); Ethan R. Steinmetz, Oakwood, OH (US); Joshua E. Nieman, Miamisburg, OH (US); Jacob A. Monat, Mendota Heights, MN (US); Brian E. Henslee, Galloway, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 78 days.

(21) Appl. No.: 17/514,279

(22) Filed: Oct. 29, 2021

Related U.S. Application Data

(60) Provisional application No. 63/107,083, filed on Oct. 29, 2020.

(51) Int. Cl.
*F41H 5/02* (2006.01)
*H01M 50/247* (2021.01)

(52) U.S. Cl.
CPC ............ *F41H 5/02* (2013.01); *H01M 50/247* (2021.01); *H01M 2220/30* (2013.01)

(58) Field of Classification Search
CPC ..... F41H 1/00; F41H 1/02; F41H 5/00; F41H 5/02–0492; F41H 5/08; H01M 50/247; H01M 2200/30

(Continued)

(56) References Cited

U.S. PATENT DOCUMENTS 3,550,159 A 12/1970 Alarco
5,008,517 A 4/1991 Brekkestran et al.
(Continued)

FOREIGN PATENT DOCUMENTS

WO 2014186042 A2 11/2014

OTHER PUBLICATIONS

Gould, "Firm Combines Battery and Armor Plate for Troops", https://www.defensenews.com/digital-show-dailies/modern-day-marine/2015/09/24/firm-combines-battery-and-armor-plate-for-troops/ , 2015, 4 pgs.

(Continued)

*Primary Examiner* — Bret Hayes
(74) *Attorney, Agent, or Firm* — DINSMORE & SHOHL LLP

(57) ABSTRACT

An apparatus for an armor system includes a housing case, an interior ballistic panel, a frame, an electrical energy storage unit, a flexible backplane system, and a control unit. The housing case includes a top shell and a bottom shell, where the top shell is removably secured to the bottom shell, forming a cavity. The interior ballistic panel is removably arranged within the cavity between the top shell and the bottom shell. The frame is arranged within the cavity between the top shell and the interior ballistic panel, the frame including a compartment. The electrical energy storage unit is arranged within the compartment of the frame, and the control unit is communicatively connected to the electrical energy storage unit to manage operation of the electrical energy storage unit. The flexible backplane system includes electrical connectors and electrical traces on a flexible substrate connecting the electrical energy storage unit to the control unit.

20 Claims, 9 Drawing Sheets

(58) Field of Classification Search
USPC .................................. 89/36.01, 36.02, 36.05
See application file for complete search history.

(56) References Cited

U.S. PATENT DOCUMENTS

| | | | |
|---|---|---|---|
| 5,221,807 A | 6/1993 | Vives | |
| 5,317,950 A | 6/1994 | Binon et al. | |
| 5,349,893 A | 9/1994 | Dunn | |
| 5,534,343 A | 7/1996 | Landi et al. | |
| 6,253,655 B1 | 7/2001 | Lyons et al. | |
| 7,367,898 B2 | 5/2008 | Hawkins et al. | |
| 7,479,344 B1 | 1/2009 | McDermott | |
| 8,240,610 B1 | 8/2012 | Cooper | |
| 8,308,489 B2 | 11/2012 | Lee et al. | |
| 8,375,839 B2 | 2/2013 | Landi | |
| 8,502,506 B2* | 8/2013 | McElroy | F41H 1/02 320/152 |
| 8,853,891 B2 | 10/2014 | Soar | |
| 9,200,871 B2 | 12/2015 | Hexels | |
| 11,378,360 B1* | 7/2022 | Monat | F41H 1/00 |
| 2005/0217471 A1 | 10/2005 | Benitsch | |
| 2008/0148929 A1 | 6/2008 | Graphenius | |
| 2009/0031467 A1 | 2/2009 | Swindells et al. | |
| 2010/0115680 A1 | 5/2010 | Thomas et al. | |
| 2012/0174764 A1 | 7/2012 | Medwell | |
| 2012/0182834 A1 | 7/2012 | Mullen et al. | |
| 2012/0291188 A1 | 11/2012 | Grosstesner | |
| 2013/0025021 A1 | 1/2013 | Wright | |
| 2014/0130225 A1 | 5/2014 | Balzano | |
| 2014/0230638 A1* | 8/2014 | Waldrop | F41H 5/0471 89/36.02 |
| 2015/0303586 A1 | 10/2015 | Hafenrichter et al. | |
| 2015/0335140 A1 | 11/2015 | Cole et al. | |
| 2017/0176148 A1* | 6/2017 | Perley | G06F 1/182 |
| 2018/0010890 A1* | 1/2018 | Waldrop | F41H 5/0492 |
| 2018/0128577 A1 | 5/2018 | Beck | |
| 2018/0249133 A1 | 8/2018 | Thiel et al. | |

OTHER PUBLICATIONS

Koon, "Soldiers Reap Rewards of Wearable Battery Design Rethink", http://intelligentsystemssource.com/soldiers-reap-rewards-of-wearable-battery-design-rethink/, 2017, 6 pgs.

Sbir, "High-performance body armor-integrated, multifunctional batteries for dismounted soldier", 2016, 3 pgs.

* cited by examiner

APPARATUSES AND WEARABLE ARMOR SYSTEMS INCLUDING ELECTRICAL SOURCES

CROSS-REFERENCE TO RELATED APPLICATIONS

This application claims the benefit of U.S. Provisional Application Ser. No. 63/107,083, filed Oct. 29, 2020.

STATEMENT REGARDING FEDERALLY SPONSORED RESEARCH OR DEVELOPMENT

This invention was made with Government support under Contract Number FA8650-16-M-2681, FA8650-17-C-2734, and FA8650-19-C-2926 awarded by the U.S. Air Force Materiel Command to Cornerstone Research Group Inc. The Government has certain rights in the invention.

TECHNICAL FIELD

The present disclosure generally relates to apparatuses and wearable armor systems including electrical sources, and more specifically, to a conformal battery-integrated armor system.

BACKGROUND

A significant number of military assets, including multiple types of soldier-worn systems, rely heavily on power provided by rechargeable batteries. As the capabilities of these systems increase, there is an ever-increasing need for batteries with more electrical energy/power. Along with the increasing need for additional electrical capacity to support these growing energy demands comes added weight and mounting space limits due to additional batteries being added to a soldier's already heavy carrying load. Additionally, batteries can be bulky, cumbersome, and restrict body movement for the dismounted soldier.

Conformal batteries (e.g. Conformal Wearable Battery, CWB) seeking to address the space limitations and operator ergonomics have been developed due to the increased need in electrical capacity. However, current conformal batteries offer reduced ballistics protection when combined with soft armor Kevlar® (E.I. du Pont de Nemours and Company, Midland, Mich.) packaging that has limited stopping protection. An alternative approach is to use Small Arms Protective Insert (SAPI) plates with the conformal batteries because of the greater ballistics protection, but such levels of ballistic protection may not be required in every situation, with the SAPI plates only adding to the carrying weight concern.

Accordingly, there is a need for improved apparatuses and wearable armor systems including electrical sources.

SUMMARY

In accordance with one embodiments of the present disclosure, an armor system includes a ballistic housing case having a top shell and a bottom shell, wherein the top shell is removably secured to the bottom shell to form a cavity; a frame which is rigid and non-electrically conductive arranged within the cavity between the top shell and the bottom shell, the frame having a compartment; an electrical energy storage unit arranged within the compartment of the frame such that the electrical energy storage unit is fully within the ballistic housing case; a control unit communicatively connected to the electrical energy storage unit to manage operation of the electrical energy storage unit; and a flexible backplane system including electrical connectors and electrical traces on a flexible substrate connecting the electrical energy storage unit to the control unit.

In accordance with another embodiments of the present disclosure, an armor system includes a housing case having a top shell and a bottom shell, wherein the top shell is removably secured to the bottom shell to form a cavity; an interior ballistic panel removably arranged within the cavity between the top shell and the bottom shell; a plurality of longitudinally arranged ribs arranged within the cavity; a plurality of latitudinally arranged ribs arranged over the plurality of longitudinally arranged ribs, wherein the plurality of longitudinally arranged ribs are secured to, or integral with, the plurality of latitudinally arranged ribs, forming a plurality of compartments; an electrical energy storage unit arranged within at least one of the plurality of compartments such that the electrical energy storage unit is fully within the housing case; a control unit arranged within at least one of the plurality of compartments and communicatively connected to the electrical energy storage unit to manage operation of the electrical energy storage unit; and a flexible backplane system including electrical connectors and electrical traces on a flexible substrate connecting the electrical energy storage unit to the control unit, wherein the flexible backplane system is disposed between the electrical energy storage unit and the interior ballistic panel.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. The embodiments set forth in the drawings are illustrative and exemplary in nature and not intended to limit the subject matter defined by the claims. Further, the following detailed description of the illustrative embodiments can be understood when read in conjunction with the following drawings, where like structure is indicated with like reference numerals and in which:

DETAILED DESCRIPTION

The armor system generally includes a housing case, a frame which is rigid and non-electrically conductive, a flexible backplane, an electrical energy storage unit, and a control unit. The housing case includes a top shell and a bottom shell, where the top shell is removably secured to the bottom shell, forming a cavity. An interior ballistic panel may be provided which is removably arranged within the cavity between the top shell and the bottom shell. The frame is arranged within the cavity between the top shell and the interior ballistic panel, the frame including a compartment. The electrical energy storage unit is arranged within the compartment of the frame, and the control unit is communicatively connected to the electrical energy storage unit to manage operation of the electrical energy storage unit. The flexible backplane system includes electrical connectors and bus bars on a flexible substrate connecting the electrical energy storage unit to the control unit. As will be described in greater detail herein, the interior ballistic panel, frame, flexible backplane, and the electrical energy storage unit may be easily removed from the cavity of the housing case. For example the interior ballistic panel could be removed if additional ballistics protection is not required beyond the level of ballistic protection of the housing case. Accordingly, the interior ballistic panel can replaced with a different ballistic protection panel, such as a small arms protective insert (SAPI) panel, a soft Kevlar® (E.I. du Pont de Nemours and Company, Midland, Mich.) insert, a ceramic armor panel, an ultra-high-molecular-weight polyethylene (UHMWPE) panel, a dry fiber material panel, or a composite material panel. The ceramic armor panel may be made from alumina, boron carbide, boron nitride, silicon carbide, or titanium diboride. The UHMWPE panel may be made from Dyneema® (DSM, Heerlen, the Netherlands) and/or Spectra® (Honeywell, Morris Plains, N.J.). The dry fiber material panel may be made of Kevlar® (E.I. du Pont de Nemours and Company, Midland, Mich.) or carbon fiber. The composite material panel may be made with Kevlar® (E.I. du Pont de Nemours and Company, Midland, Mich.) or carbon fiber. Various embodiments of the armor system will be described in greater detail herein.

Figure 1:
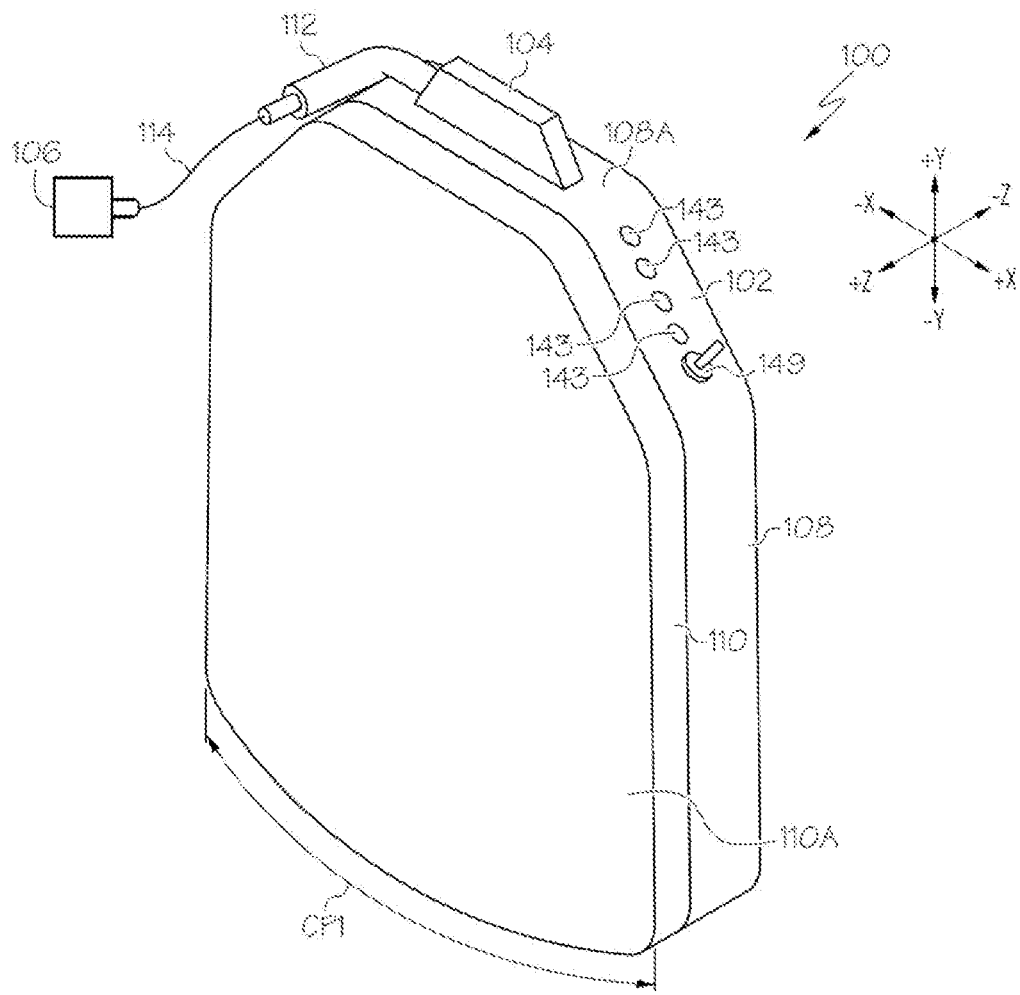
FIG. 1 schematically depicts an armor system, according to one or more embodiments shown or described herein.

Referring now to FIG. 1, an embodiment of an armor system 100 is generally depicted. As illustrated, the armor system 100 may include a housing case 102, an external connector 104, and an external device 106. As will be described in greater detail herein, the armor system 100 is configured to be modular to allow for the repair of damaged components and replacement of components for situation specific instances. It is noted that the present armor system could also be used in any applications where there is a need for electrical power or ballistic protection, including military battlefield operations and submersible dive battery application.

Figure 8:
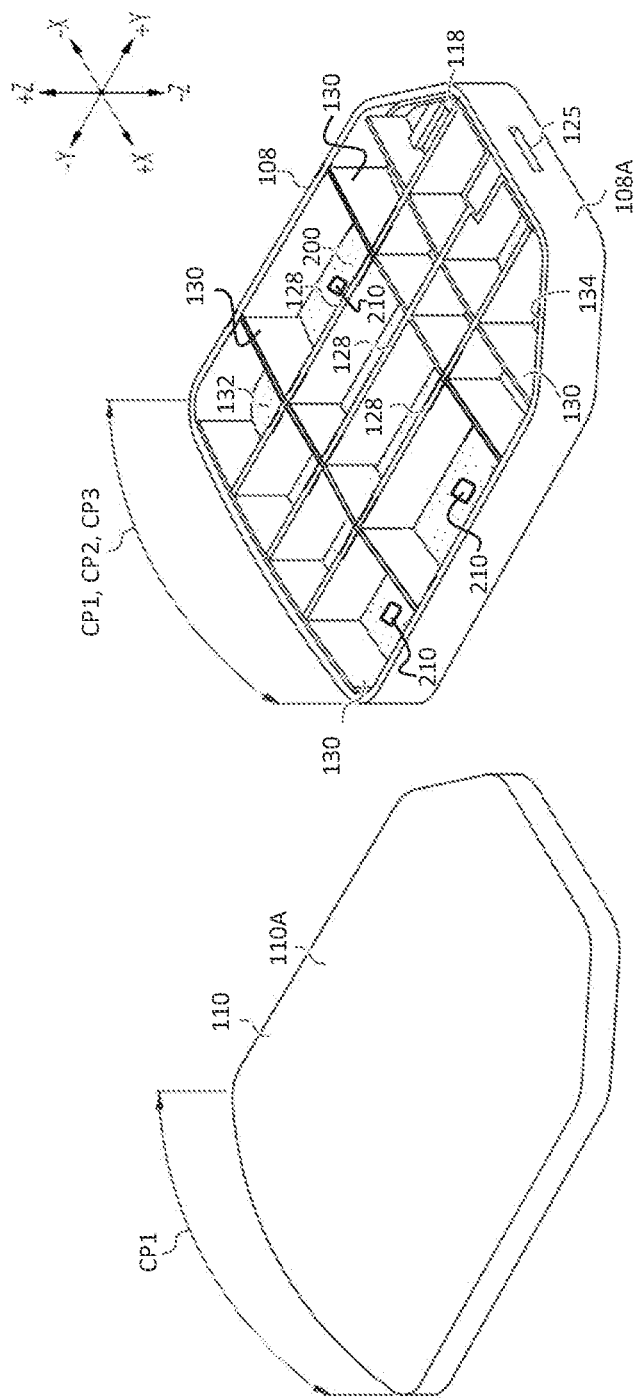
FIG. 8 schematically depicts the armor system of FIG. 1 with a plurality of electrical sources removed, according to one or more embodiments shown or described herein.

Referring again to FIG. 1, the housing case 102 may have an exterior geometry that matches commonly used SAPI plate and include a bottom shell 108 and a top shell 110. The bottom shell 108 may further include a top surface 108A to allow the external connector 104 to sit flush against the housing case 102. The bottom shell 108 may also include holes 107 (FIG. 2) which allow LEDs 143 to pass through the bottom shell 108. A button 149 may also be arranged within a through-bore of bottom shell 108 to allow a user to activate LEDs 143. LEDs 143 may be arranged to communicate to a user the charge level of the electrical energy storage units 122 contained within the armor system 100, or to inform the user of a damaged components or a charging state. It will be appreciated that the holes 107, LEDs 143, and button 149 may also be positioned within the top shell 110. In a further embodiments, the top shell 110 may completely encase the bottom shell 108 such that the holes 107 are provided in both the top shell 110 and the bottom shell 108 and aligned to allow passage of LEDs 143 and button 149. Additionally, the top shell 110 may further include an external face 110A to allow an exterior ballistic panel to be abutted against the top shell 110 (see FIG. 8).

In various embodiments, the bottom shell 108 and top shell 110 may be secured together by a friction fit, a removable adhesive, or an external fabric or tape wrap, but any securement means can be used without departing from the scope of this disclosure.

It is noted that the housing case 102 and/or various components thereof may be made from a variety of materials. For example, in one non-limiting embodiment, the housing case 102 is made from a fiber-reinforced polymer matrix composite, such as an aramid fiber (Kevlar® (E.I. du Pont de Nemours and Company, Midland, Mich.)) fiber reinforced epoxy matrix composite. In a further non-limiting embodiments, the housing case 102 is made from a rigid plastic such as acrylonitrile butadiene styrene (ABS) or nylon, polycarbonate, UHMWPE. It should be noted that both the bottom shell 108 and the top shell 110 have a curved profile CP1, which allows the housing case 102 to conform to the chest area of a human user. However, it should be appreciated that housing case 102 can also have a flat profile. In some embodiments, the housing case 102 is a rigid or conformal case which may be environmentally sealed against dust and water intrusion (e.g. IP67 or IP68 in accordance with the International Electrotechnical Commission standards). Additionally, the housing case 102 may be rated for MIL-STD-810 shock, vibration, and drop testing in accordance with the Institute of Environmental Sciences and Technology standards of the United States Military. The armor system 100 may be designed to provide additional ballistic protection when worn in front of or behind the interior ballistic panel 116, or may act as standalone ballistic protection (e.g. NIJ Level IIA, II, III, or IV in accordance with the National Institute of Justice standards) when worn without the interior ballistic panel 116.

In some embodiments, the housing case 102 may be made from a thin, impact/ballistic resistant case material which may be a thermoplastic or thermoset resin case, with or without fiber reinforcement. A lightweight, thermally insulated, fire-resistant layer may be arranged between the interior ballistic panel 116 and the bottom shell 108 to protect a user in the event of battery thermal runaway or a fire. Example fire-resistant layers include those formed from dry fibers of Kevlar® (E.I. du Pont de Nemours and Company, Midland, Mich.), and/or carbon fibers, ceramic materials or foam.

In some embodiments, the polymer materials used to make the housing case 102 can be a fiber reinforced thermoplastic or thermoset composite. Non-limiting examples of thermoplastic resin used to make the bottom shell 108 and the top shell 110 are polypropylene, polyethylene, polyether ether ketone, polyphenylene oxide, polyphenylene ether, Noryl, and polyvinylidenefluoride. Non-limiting examples of thermosetting resin used to make the bottom shell 108 and the top shell 110 are epoxy, vinyl ester, polyester, polyurethane. Non-limiting examples of fiber reinforcement materials in the composite include carbon, glass, aramid, polypropylene, polyethylene, and hybrid laminates made with multiple reinforcement materials. The fiber reinforcement used to make the composite may include various material forms, including but not limited to random mats, scrims, chopped fibers, knits, unidirectional plies, three-dimensional weaves, three-dimensional fiber preforms, plain weave fabrics, twill fabrics, harness satin fabrics, prepreg (i.e. pre-impregnated composite fibers where a thermoset polymer matrix material, such as epoxy, or a thermoplastic resin is already present), Tpreg (i.e. thermoplastic prepreg), or combinations thereof. In some embodiments, the polymer materials used to make the housing case 102 can be a fiber reinforced thermoplastic.

The housing case 102 comprises a sufficient rigidity to be self-supporting and capable of retaining a pre-defined shape. That is, the housing case 102 is what is colloquially referenced as "stiff" or "rigid" in contravention to an article formed from a fabric where in the absence of a support structure the article would collapse and not retain a pre-defined shape. As quantitative definition of rigidity is based on both material thickness and a Young's modulus of the material, examples of such properties of the housing case 102 are provided. In various embodiments, the housing case 102 may comprise a wall thickness of 0.5 millimeters (mm) to 3 mm and a Young's modulus of 1 megaPascal (MPa) to 15 gigaPascals (GPa) as well as the various combinations formed by the expressly disclosed ranges.

Referring still to FIG. 1, the external connector 104 may include a socket 112 and a flexible power cable 114. The external connector 104 may be removably arranged to the top surface 108A. It will be appreciated that the external connector 104 may alternatively be removably arranged to the bottom surface 108B or a side surface 108C of the housing case 102. The external connector 104 connects with the internal comments within the housing case 102 through aperture 125 arranged in the top surface 108A (see FIG. 2). The power cable 114 can connect the armor system 100 with an external device 106 in order to power the external device 106. Examples of external device 106 include a radio, light source, mobile device, or the like. The power cable 114 can be removably secured to the external device 106 and the socket 112. In some embodiments, the power cable 114 is a silicone insulated high strand count wire.

Figure 2:
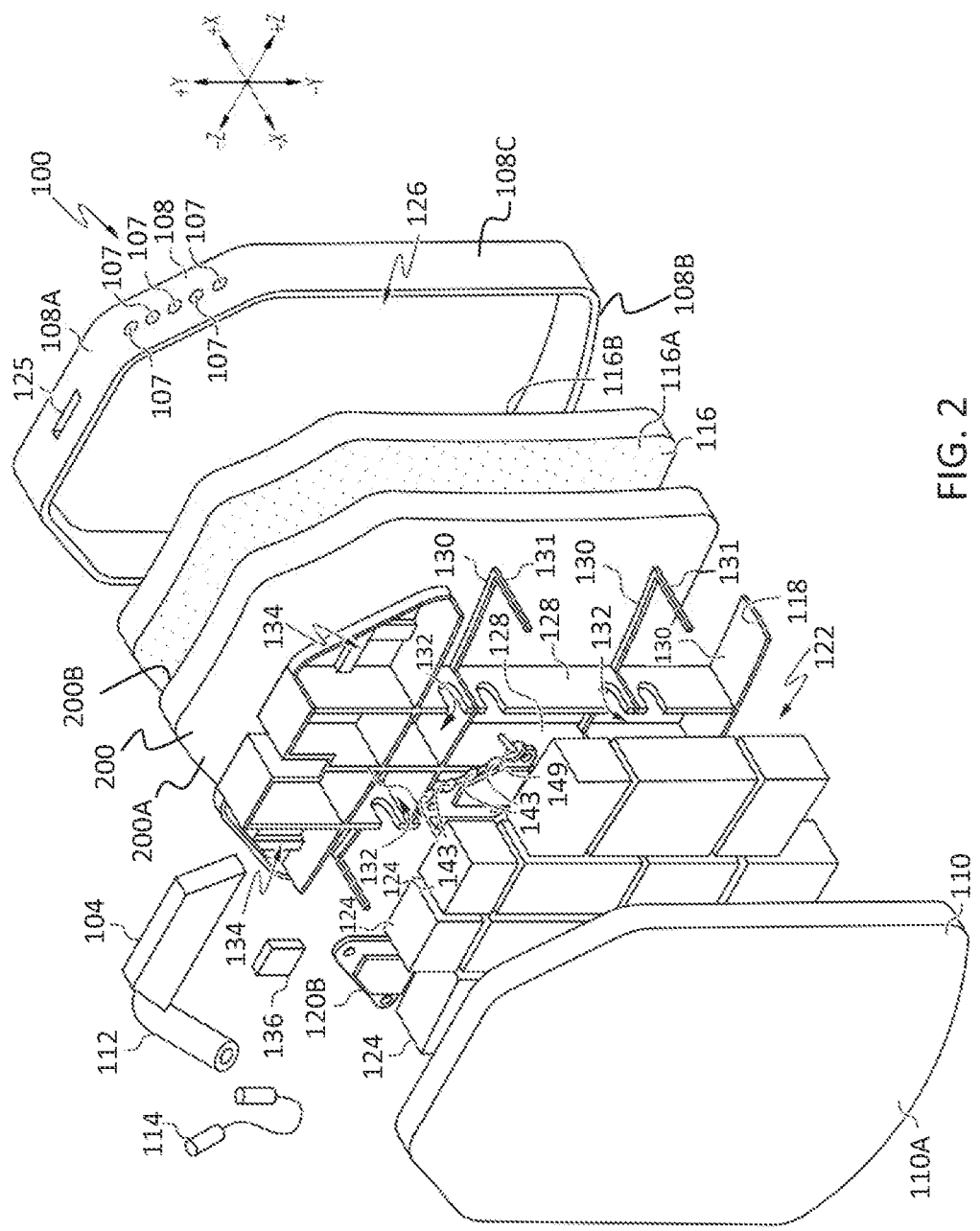
FIG. 2 schematically depicts an exploded view of the armor system of FIG. 1, according to one or more embodiments shown or described herein.

Referring now to FIG. 2, the armor system 100 may further include an interior ballistic panel 116, a frame 118, a flexible backplane system 200, and an electrical energy storage unit 122, all arranged within the cavity 126 formed between the bottom shell 108 and the top shell 110. As depicted in FIG. 2, the bottom shell 108 further includes an aperture 125, which allows for an external connector 136 to pass through the housing case 102 to connect the electrical energy storage unit 122 with an external device 106 (FIG. 1). As the electrical energy storage units 122 are disposed in the cavity 126, it will be appreciated that a battery pack or other means of storing electrical energy external to the housing case 102 do not offer the same benefits and advantages of the present armor system 100.

Still referring to FIG. 2, the interior ballistic panel 116 is generally arranged behind the frame 118, the flexible backplane system 200, and the electrical energy storage unit 122 in the +/−Z direction. In some embodiments, the interior ballistic panel 116 may be arranged in front of the frame 118, the flexible backplane system 200, and the electrical energy storage unit 122 in the +/−Z. In further embodiments, the interior ballistic panel 116 may be omitted from the housing case 102 if a specific situation does not require the additional ballistic protection besides that provided from the housing case 102. The frame 118 abuts against the surface 200A of the flexible backplane system 200, while the surface 200B of the flexible backplane system 200 abuts against the surface 116A of the interior ballistic panel. Further, surface 116B of the interior ballistic panel abuts against the bottom shell 108.

Still referring to FIG. 2, the frame 118 may also include control unit compartments 134, which may be rectangular, non-rectangular or triangular to match the shape of the housing case 102 and to allow maximum number of batteries to be placed into rectangular battery compartments. In some embodiments, a single control unit 120 may be split into two or more separate control units 120A and 120B to fit within the sizing of the control unit compartments 134. Control units 120A and 120B are shaped to fit within the shape of the control unit compartments 134. Each of the separated control units 120A and 120B may control different functions of the armor system 100.

In some embodiments, the control units 120A and 120B are printed circuit boards having one or more of the following features: flat or conformal circuit boards, overcurrent protection, overvoltage protection, undervoltage protection, a state-of-charge (SOC) measurement, a SOC indication via external LEDs 143, a state-of-health (SOH) indication via external LEDs 143 (e.g. indicating remaining battery life or capacity), a system management bus (SMBus) for SOC and SOH data and charge control, passive and/or active battery cell balancing where active cell balancing can maintain similar SOC between all batteries 124 during charging and discharging, a capability of disabling individual batteries 124 or a string of batteries 124 in the event of malfunction or damage, and optionally provide multiple output voltages to reduce/eliminate the need for downstream DC-DC converters for different voltages.

Still referring to FIG. 2, the electrical energy storage unit 122 includes a plurality of batteries 124. In some embodiments, each battery 124 is a single, closed-system battery which may be removed separately from the remainder of the plurality if a single battery 124 is damaged or in need of replacement. The plurality of batteries 124 fit within the compartments 132 of the frame 118, with each battery 124 being arranged within a single compartment 132. In some embodiments, the batteries 124 may be the same size and shape.

In some embodiments, the batteries 124 may be high specific energy rechargeable battery cells. Specifically, the batteries 124 may be high specific energy rechargeable lithium battery cells. The batteries 124 may also have inherent fail-safe capabilities for the following conditions per United Nations Transportation Testing for Lithium Ion and Lithium Metal Batteries (UN Manual of Tests and Criteria § 38.3): Crush, Puncture, Short circuit, Over-discharge, Over-charge, Altitude, Shock, and Vibration. Additionally, in some embodiments, the electrical energy storage unit 122 may have a discharge capacity of 5-30 Ah, preferably 8-12 Ah, a nominal voltage of 10-36 volts (V), 10-18V, or 20-36V, a total energy of 50-400 watt-hours (Wh), preferably 100-300 Wh, a continuous discharge of 5-30 amperes (A), and a pulse discharge of 20-120 A.

Figure 3:
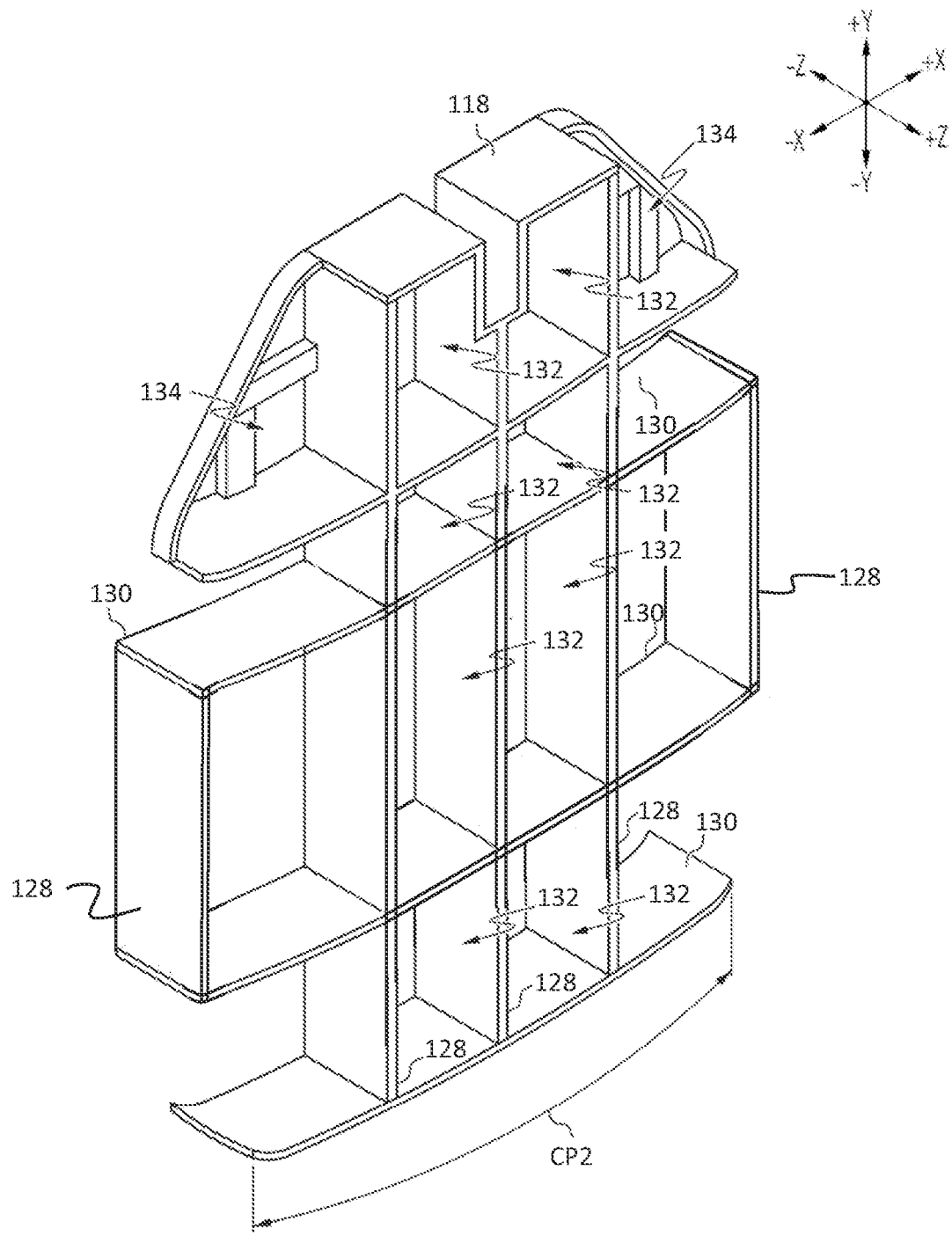
FIG. 3 schematically depicts a frame of the armor system of FIG. 1, according to one or more embodiments shown or described herein.

Still referring to FIG. 2, the frame 118 may be arranged within the cavity 126 to abut against the flexible backplane system 200 along surface 200A when the armor system 100 is assembled. With reference to FIG. 3, the frame 118 includes a plurality of latitudinally arranged ribs 128 in the +/−Y direction, and a plurality of longitudinally arranged ribs 130 in the +/−X direction. The plurality of latitudinally arranged ribs 128 may be arranged perpendicular to and secured to the plurality of longitudinally arranged ribs 130 to form a plurality of compartments 132 in the frame 118. In some embodiments, such compartments may be rectangular in shape to match the shape of the battery to be housed inside these compartments. In some embodiments, the frame 118 can be made from an integral piece of material, such as injection molded or 3D printed nylon material, with a wall thickness of each rib greater than 0.8 mm, greater than 1.2 mm, or greater than 1.6 mm. For purposes of clarity, wall thickness is a measurement of the latitudinally arranged ribs 128 or longitudinally arranged ribs 130 in the X-Y plane of the provided Figures. It will be appreciated that an upper limit to the wall thickness of each rib may vary such that the compartments 132 retain sufficient space to retain the batteries 124. In one or more embodiments, the wall thickness if less than or equal to 3 mm. Further, in one or more embodiments, the plurality of latitudinally arranged ribs 128 and/or the plurality of longitudinally arranged ribs 130 may extend across the entire height or width of the cavity 126 formed in the bottom shell 108. It will be appreciated that when the plurality of latitudinally arranged ribs 128 and/or the plurality of longitudinally arranged ribs 130 extend across the bottom shell 108 and/or are from an integral piece of material the strength of the frame 18 is increased.

The frame 118 may provide buffering and isolation between batteries 124 in the event of a thermal runaway event as well as keep the batteries 124 from shifting around inside the housing case 102 during movement of the wearer of the armor system 100. It will be appreciated that minimizing movement of the batteries 124 is desirable to to avoid short circuits between batteries 124. The frame 118 may provide additional rigidity and reinforcement to the ballistic housing case to prevent blunt force crushing of the batteries 124 during impact events to the wearer or during vigorous movement as well as improve ballistic performance of the system 100. Further, it will be appreciated that the frame 118 forms a rigid structure that does not allow substantial deflection of the plurality of latitudinally arranged ribs 128 and/or the plurality of longitudinally arranged ribs 130.

In various embodiments, the frame 118 may comprise 4 to 48 compartments 132, 4 to 36 compartments 132, 4 to 24 compartments 132, 4 to 18 compartments 132, or 8 to 24 compartments 132. It will be appreciated that that the small cells formed from a corrugated grid or a matrix, such as a honeycomb, forming greater than 48 individual small cells would not be able to function as the compartments 132 of the present disclosure. Specifically, the compartments 132 must be configured to house individual batteries 124 of the electrical energy storage unit 122 and as such must be of sufficient size and shape to stably and securely retain such batteries 124 without unutilized space.

In various embodiments, the battery 124 or other components of the armor system 100 occupies at least 90%, at least 95%, or at least 98% of the profile of the compartment 124 aligned with the plane formed by the x-axis and y-axis as illustrated in the included figures.

In various embodiments, the frame 118 may comprise substantially rectangular compartments 132 with length (Y-axis) and width (X-axis) dimensions of 25 millimeters (mm) by 25 mm, 35 mm by 17 mm, 35 mm by 35 mm, 70 mm by 70 mm, 100 mm by 100 mm as well as the combinations subsumed by the range of 15 mm to 125 mm. Further, the compartments 132 may have a height (Z-axis) of 3 mm to 15 mm, 3 mm to 20 mm, or 7 mm to 15 mm.

The frame 118 may have a curved profile CP2, which allows the frame 118 to be arranged flush within the housing case 102, since the housing case 102 also has a curved profile CP1, as stated above. In some embodiments, the curved profile CP1 is identical to the curved profile CP2.

Figure 4:
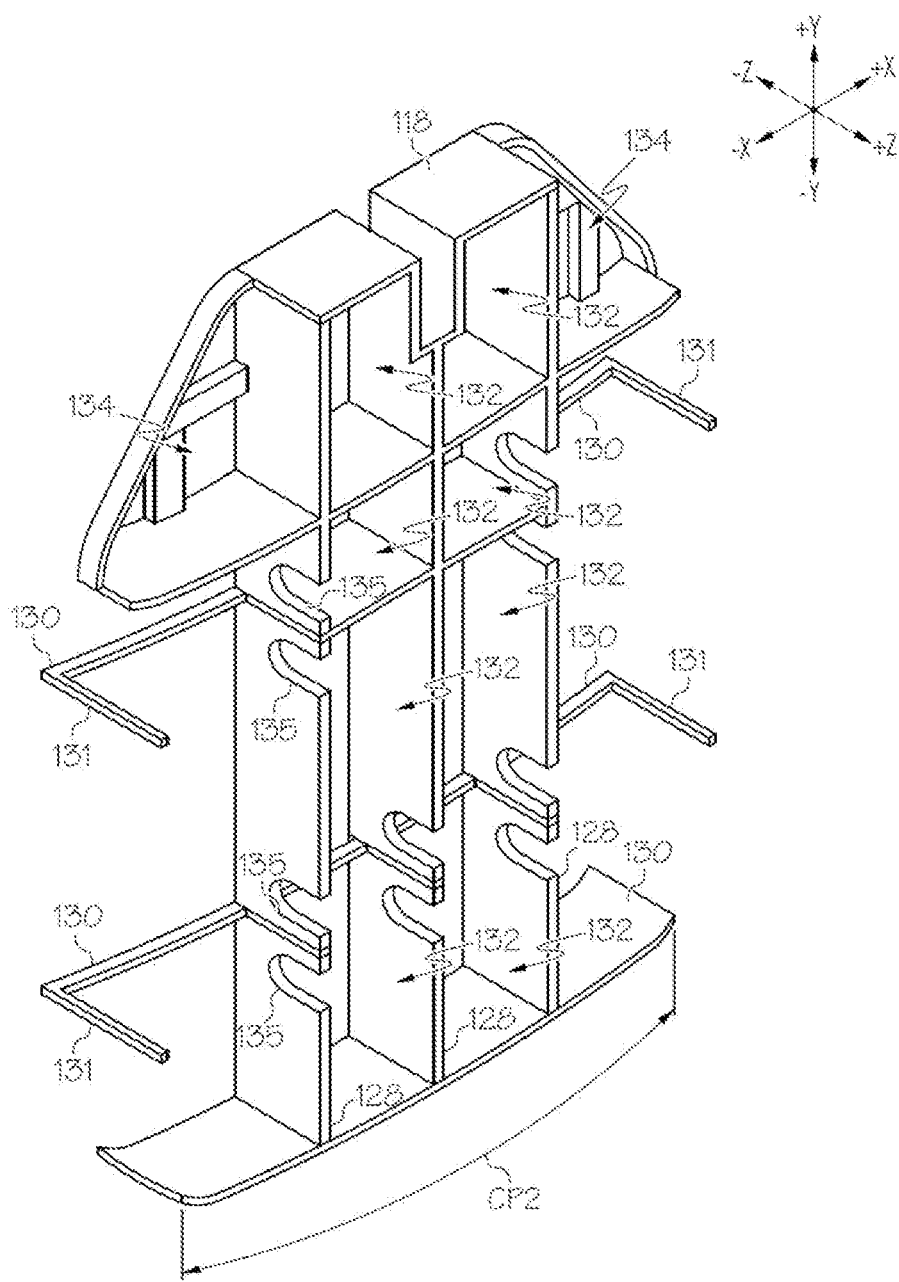
FIG. 4 schematically depicts an alternate arrangement frame of the armor system of FIG. 1, according to one or more embodiments shown or described herein.

Referring now to FIG. 4, the frame 118 may further include channels 135 arranged in the plurality of latitudinally arranged ribs 128. The channels 135 are arranged to allow interconnectivity between compartments 132 when the armor system 100 is assembled. Further, in some embodiments, the longitudinally arranged ribs 130 may include tabs 131 arranged on the end of the longitudinally arranged ribs 130. The tabs 131 may be used to form additional compartments 132 within the frame 118, or may be used to secure the frame 118 within the housing case 102 by abutting against the housing case 102 when the frame 118 is within the cavity 126.

Figure 5:
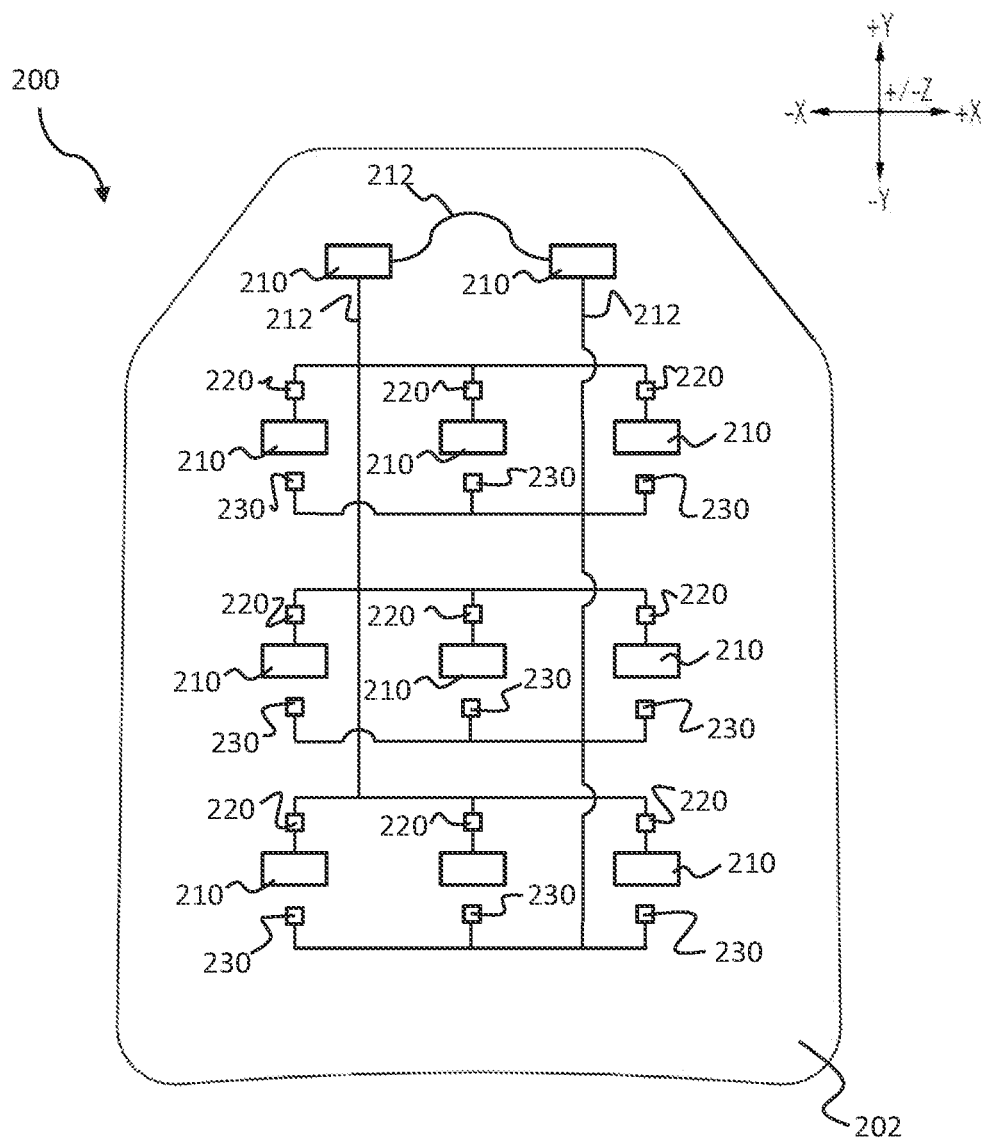
FIG. 5 schematically depicts a flexible backplane system of the armor system of FIG. 1, according to one or more embodiments shown or described herein.

Referring now to FIG. 5, the flexible backplane system 200 includes a flexible substrate 202 with printed circuitry and a plurality of electrical connectors 210 for attachment of various components including, but not limited to, the batteries 124 and the control unit 120.

The flexible substrate 202 may be formed from an electrically insulative material which is capable of bending without breaking. Specifically, the flexible backplane system 200 is capable or warping and bending to conform to non-planar geometries. It will be appreciated that rigidity or flexibility depends on both modulus and thickness. In various embodiments, the flexible substrate 202 may have a thickness of 0.05 mm to 1 mm and a Young's modulus of 2.5 to 5.0 gigaPascals (GPa). In one or more specific embodiments, the flexible substrate 202 may have a thickness of approximately 0.1 mm and a Young's modulus of approximately 4.0 GPa. However, from a practical perspective, to be considered flexible, the flexible substrate 202 must be capable of being laid against the frame 118 and conforming to the curvature of the frame 118 and/or the housing case 102 In one or more embodiments, the flexible substrate is formed from a polyimide film, such as Kapton (E. I. du Pont de Nemours and Company), a nylon film, or a polyester film or fabric such as polyethylene terephthalate (PET) film or fabric.

Still referring to FIG. 5, the flexible substrate 202 includes electrical traces 212 in the form of printed circuitry to electrically connect various components of the armor system 100 in a prescribed manner. The electrical traces 212 may be applied in accordance with various methods known to those skilled in the art. In one or more embodiments, the electrical traces 212 may be formed by laminating together a conductive material and the flexible substrate such as a polyimide layer; depositing a resist coating over the conductive material layer; patterning the resist layer by a lithographic process; etching the conductive material layer; and stripping the resist. Example conductive material layers include those comprising aluminum (Al), copper (Cu), gold (Au), silver (Ag), or platinum (Pt). In one or more embodiments, the electrical traces 212 may be formed by applying a conductive ink to the flexible substrate 202 in the desired pattern. A commercially available flexible conductive ink is the Intexar™ line of stretchable electronic inks from DuPont Microcircuit Materials (Research Triangle Park, NC).

In one or more embodiments, the flexible substrate 202 is a flexible printed circuit board and comprises a thin, flexible electrically insulating layer (such as polyester, polyimide, thermoplastic), on which is disposed a patterned electrically conducting layer (such as copper), A further protective cover layer may be disposed over the conducting layer to protect it, the cover layer having apertures to provide electrical access to the conducting layer.

Still referring to FIG. 5, the flexible backplane system 200 includes a plurality of electrical connectors 210 for attachment of various components. The electrical connectors 210 provide pre-positioned locations for attachment of additional components of the armor system 100. For example, in one or more embodiments, an electrical connector 210 may be provided at a location on the flexible substrate 202 aligned with the positioning of each battery 124.

Inclusion of the electrical connectors 210 at prescribed locations allows for assembly and connection of each battery 124 to the flexible backplane system 200 without requiring the assembly technician to layout the intricate electrical cable connections and wiring between the batteries 124 and other components of the armor system 100. Specifically, the electrical traces 212 included as part of the flexible substrate 202 provide the intricate electrical connections and wiring to the electrical connectors 210 where an assembly technician can simply connect each battery 124.

Further, inclusion of the electrical connectors 210 at prescribed locations also allows for assembly and connection of the control unit 120 to the flexible backplane system 200 without requiring the assembly technician to layout the intricate electrical cable connections and wiring between the control unit 120 and other components of the armor system 100. Specifically, the electrical traces 212 included as part of the flexible substrate 202 provide the intricate electrical connections and wiring to the electrical connectors 210 where an assembly technician can simply connect the control unit 120.

In one or more embodiments, the electrical connectors 210 may be quick-connect type connectors where the components of the armor system 100 such as the batteries 124 or the control unit 120 are simply plugged into a receptacle or mating module. It will be appreciated that such arrangement allows for components of the armor system 100 to be quickly and easily replaced if a component experiences premature failure. For example, batteries 124 experience decrease in capacity and/or performance over the course of the prescribed service life, but with the quick-connect type connectors, a replacement battery may be swapped out easily to return the armor system 100 to original capacity and performance. Further, the control unit 120 may be quickly swapped to replace a faulty or outdated control unit. Examples of quick-connect type connectors are mechanism which form a locking connection as well or electrical contact pads. The specific mechanisms for forming a locking connection may include those generally known for forming electrical connections or fixation of components to a circuit board. For the sake of completeness, it is indicated that an electrical contact pad may alternatively be referenced as a bond pad and is an exposed region of metal or other conductive material on a circuit board for connection of a component lead thereto.

In one or more embodiments, the electrical connectors 210 may be provided as holes in any insulating layer to expose the electrical trace 212 of the flexible substrate 202 to allow soldering of the components of the armor system 100 such as the batteries 124 or the control unit 120 to the flexible substrate 202.

While the control unit 120 is illustrated in various Figures of the present application as split into separate control units 120A and 120B it will be appreciated that a single control unit 120 may also be utilized. Further, the control unit 120, whether a single unit or split into multiple units, may be placed at any location across the flexible substrate 202. For example, the control unit may be placed proximal a bottom corner of the armor system 100, proximal the top of the armor system 100, or at a central location of the armor system 100. The frame 118 may be adjusted to provide the desired geometry and compartments for the desired layout of batteries 124 and control units 120.

With continued reference to FIG. 5, a plurality of fuses 220 are arranged along the electrical traces 212 of the flexible substrate 202. The fuses 220 prevent excessive current draw (and thus heat generation) during a short-circuit scenario. A short-circuit scenario may be caused by ballistic damage to one or more batteries 124. The fuses 220 allow the damaged battery 124 to be electrically isolated while the rest of the batteries 124 are to continue to operate allowing the armor system 100 to continue to function and output power with a reduced capacity. The fuses 220 are placed along the electrical traces 212 connecting the batteries 124 to the other components of the armor system 100. In one or more embodiments, the fuses 220 are fast-blow fuses or quick-blow fuses. In some embodiments, the batteries 124 may be arranged into groups of batteries 124, with a single fuse 220 controlling each group of batteries 124. This arrangement reduces the required number of fuses 202, while allowing the same amount of batteries 124 to be used. In other embodiments, each battery 124 may be connected to an individual fuse 220 to allow for electrical isolation of only the batteries 124 exhibiting a short-circuit, thereby allowing a greater number of batteries 124 to remain operational.

With continued reference to FIG. 5, a plurality of temperature sensors 230 are arranged on the flexible substrate 202. In one or more embodiments, one or more temperature sensors 230 is provided proximal each battery 124. A temperature sensor 230 in proximity to a battery 124 provides indication of the temperature of the battery 124. It will be appreciated that the operational efficiency as well as the safety of the battery 124 is decreased as the temperature of the battery 124 increases. For example, a period of increased electrical draw from the battery 124 may result in an elevation of the temperature of the battery 124. Similarly, a fault or issue with a battery 124 may also result in an elevation of the temperature of the battery 124. To maximize the lifespan and performance of the armor system 100 and the health and safety of a user of the armor system 100 it is desirable to avoid over temperature events in the batteries 124. An over temperature event in the batteries 124 may be considered to be a battery temperature greater than 55° C. In addition to monitoring high temperature or overheating conditions, the temperature sensor 130 may also monitor for cold temperature to ensure optimal charging conditions. Charging lithium-ion batteries at low temperature (less than 0° C.) without reducing charging current may damage the batteries. As such, the temperature sensor 130 may communicate with the control unit 120 to optimize charging and discharging parameters.

The temperature sensors 130 may be connected to the control unit 120 such that the control unit 120 can adjust the current flow to and/or from each battery 124 to maintain operation within the desired operational parameters. Specifically, if a particular battery 124 or group of batteries 124 exhibits an elevated temperature the control unit 120 may reduce the demand on or charging rate to the identified batteries 124 to allow them to cool and avoid damage or reduced efficiency. The temperature sensors 130 may be connected to the control unit 120 via electrical traces 212. In one or more embodiments, the electrical traces 212 connecting the temperature sensors 130 to the control unit 120 are distinct from the electrical traces 212 connecting the batteries 124 to the control unit 120.

In some embodiments, the batteries 124 may be arranged into groups of batteries 124, with a single temperature sensor 230 monitoring the entire group of batteries 124. This arrangement reduces the required number of temperature sensors 230, while allowing the same amount of batteries 124 to be used. In other embodiments, each battery 124 may be mated with one or more dedicated temperature sensors 130 to allow for monitoring and adjustment of each battery 124 individually. Monitoring of the temperature of each battery 124 individually allows a greater number of batteries 124 to remain operational and/or at peak output.

The temperature sensors 230 may be any unit capable of measuring and relaying a signal indicative of a measurable temperature. For example, the temperature sensors 230 may be a thermistor, an infrared sensor, a change-of-state sensor, or a thermocouple depending on the operational sensor data desired.

It is noted that the electrical traces 212 shown in FIG. 5 are simplified for ease of illustration. Specifically, a single electrical trace 212 is shown connecting all the batteries 124 and/or temperatures sensors 230 in a webbed manner, but it will be appreciated that it is envisioned and in one or more embodiments desired that individual and separate electrical traces 212 may be provided to each individual components. For example, a first electrical trace 212 may be provided to a first battery 124, a second distinct electrical trace 212 may be provided to a second battery 124, and a third distinct electrical trace 212 may be provided to a third battery 124. One skilled in the art is able to lay-out the specific routing of the electrical traces 212 forming the connections between various components of the armor system 100 based on the generic routing and connections provided in FIG. 5.

It is noted that placement of the flexible backplane system 200 between the batteries 124 and the interior ballistic panel 116 separates such components and provides an electrical barrier therebetween. Specifically, the flexible substrate 202 provides electrical insulation between the batteries 124 and the interior ballistic panel 116. Such electrical insulation and separation is advantageous because the interior ballistic panel 116 may be formed from a material such as a silicon carbide material that may be electrically conductive due to the presence of impurities and thus may cause current leakage and interfere with performance of the batteries 124 with exposed wires or soldered connections not insulated from the interior ballistic panel 116. As noted previously, the electrical traces 212 provided on the flexible substrate 202 allow for the multitude of exposed wires which would otherwise be necessary to connect the batteries 124, control unit 120, and other armor system 100 components to be removed. Elimination of such exposed wires lessens the likelihood of a short circuit forming between the batteries 124 and the interior ballistic panel 116.

Figure 6A:
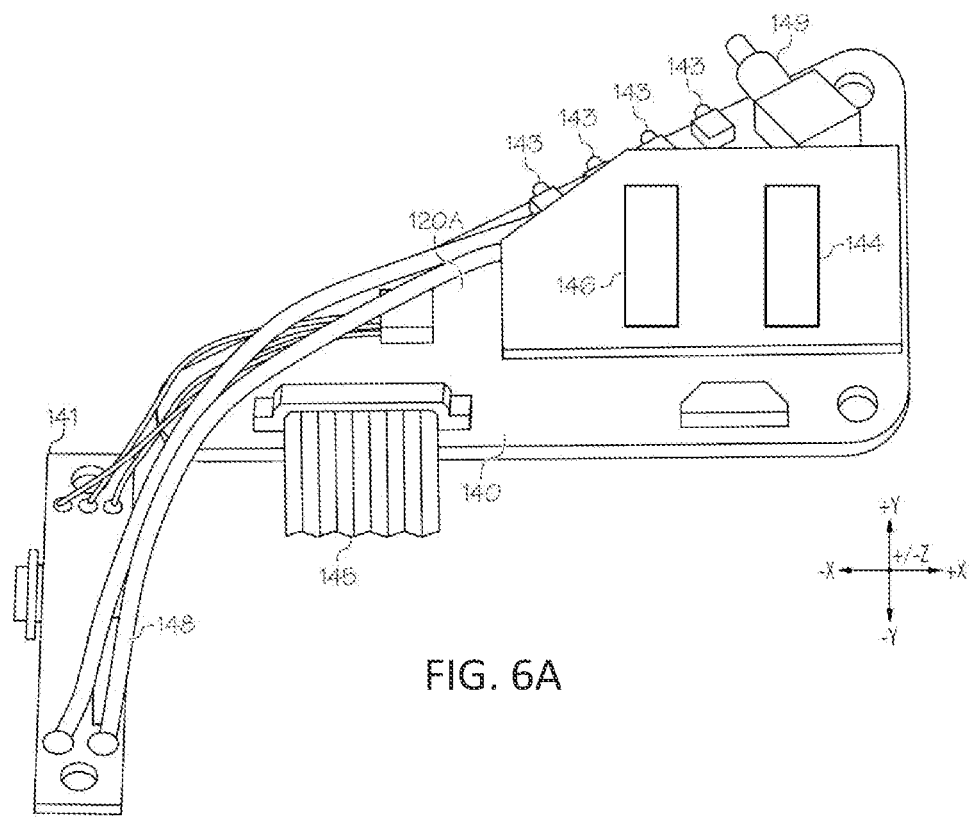
FIG. 6A schematically depicts a control unit of the armor system of FIG. 1, according to one or more embodiments shown or described herein.

Referring now to FIG. 6A, in one or more embodiments, the control unit 120A includes a circuit board 140, voltage controller 141, LEDs 143, a fuel gauge integrated circuit (IC) microcontroller 144, a temperature sensor 146, and the button 149. The fuel gauge integrated circuit (IC) microcontroller 144 and the temperature sensor 146 may be arranged on the circuit board 140 in a variety of configurations. The voltage controller 141 is communicatively connected to the circuit board 140 via wire 148. In one or more embodiments, the voltage controller 141 is communicatively connected to the circuit board 140 via electrical pathways provided in the flexible backplane system 200. As stated above, the LEDs 143 and button 149 allow a user to receive output information from the armor system 100, such as power supply level and charge status. The fuel gauge Integrated Circuit (IC) microcontroller 144 may monitor and provide output to control the charge and discharge functionality of the batteries. In one or more embodiments, a connector cable 145 may be provided to connect the control unit 120A with the control unit 120B in order to pass communication signals between the two separate control units, which are working together as a single control unit. In further embodiments, connection between the control unit 120A and the control unit 120B may be provided via the flexible backplane system 200. The temperature sensor 146 may determine the temperature of the batteries 124 during operation, and can alert a user to changes within the system based on the temperature change, such as if a battery 124 is damaged or thermal runaway occurs within the housing case 102. The circuit board 140 is communicatively connect with each battery 124 of the electrical energy storage unit 122 via the flexible backplane system 200.

Figure 6B:
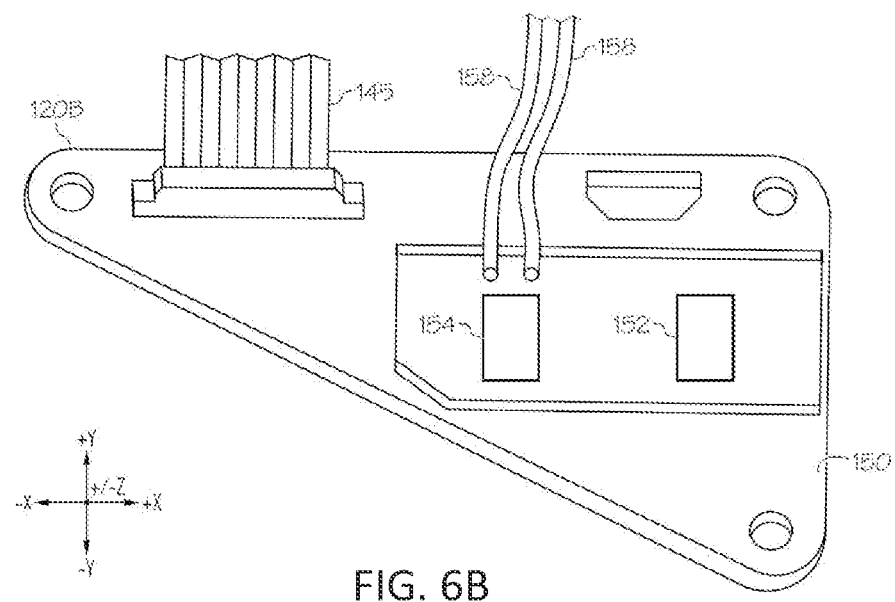
FIG. 6B schematically depicts a control unit of the armor system of FIG. 1, according to one or more embodiments shown or described herein.

Referring now to FIG. 6B, control unit 120B includes circuit board 150, a transistor 152, a resistor 154, and external power cables 158. The transistor 152, resistor 154, and external power cables 158 are all communicatively connected to the circuit board 150. In one or more embodiments, the connector cable 145 is also communicatively connected to the circuit board 150, and allows the control units 120A and 120B to send signals and power to one another. In further embodiments, connection between the control unit 120A and the control unit 120B is be provided via the flexible backplane system 200 and the connector cable 145 is omitted. In some embodiments, the transistor 152 may be a bi-directional metal-oxide-semiconductor field-effect transistor (MOSFETs) that controls the current flow from the plurality of batteries 124. Additionally, the resistor 154 may be a shunt resistor that measures the current flow from the plurality of batteries 124. In one or more embodiments, the transistor 152 and resistor 154 are communicatively connected with the batteries 124 via the flexible backplane system 200. The external power cables 158 allow power to be transferred from the batteries 124, through the control units 120A and 120B, and out to the external connector 136. However, the external power cables 158 may be fed through the aperture 125 in the housing case 102 to power and external device 106.

Figure 7:
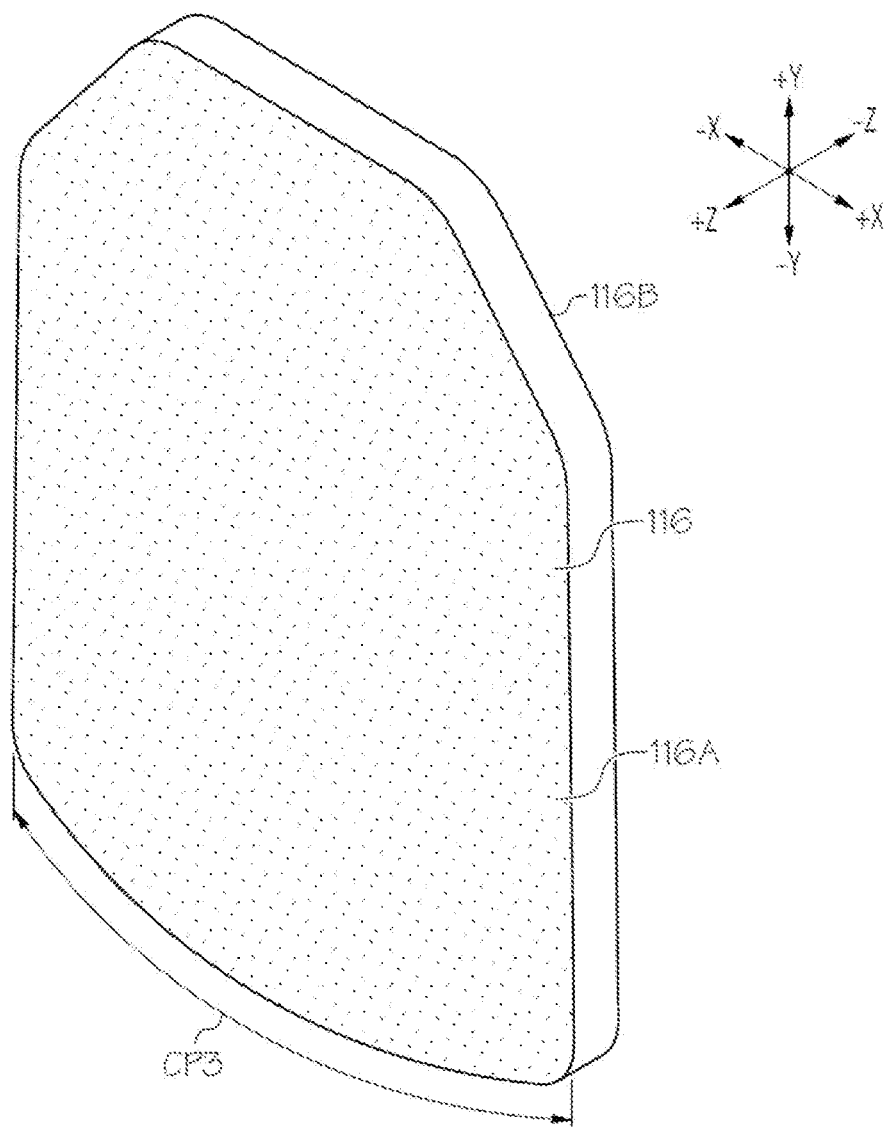
FIG. 7 schematically depicts an interior ballistic panel of the armor system of FIG. 1, according to one or more embodiments shown or described herein.

Referring now to FIG. 7, the interior ballistic panel 116 may have a curved profile CP3, which allows the interior ballistic panel 116 to be arranged flush within the housing case 102, since the housing case also has a curved profile CP1, as stated above. In some embodiments, the curved profile CP1 is identical to the curved profile CP3. Additionally, the curved profile CP3 of the interior ballistic panel 116 allows the frame 118, the flexible backplane system 200 and the interior ballistic panel 116 to each abut flush against the respective adjacent component or components when arranged within the housing case 102. Specifically, as the flexible backplane system 200 is capable or warping and bending to conform to non-planar geometries, the frame 118 and the interior ballistic panel 116 may securely mate with the flexible backplane system 200 disposed therebetween. In some embodiments, the curved profiles CP1, CP2, and CP3 are identical. The interior ballistic panel 116 may vary from a small arms protective insert (SAPI) to a soft Kevlar® (E.I. du Pont de Nemours and Company, Midland, Mich.) insert. Other examples include ceramic armor panel made with materials such as alumina, boron carbide, boron nitride, silicon carbide, titanium diboride, Ultra-high-molecular-weight polyethylene (UHMWPE) panel such as Dyneema® (DSM, Heerlen, the Netherlands) and Spectra® (Honeywell, Morris Plains, N.J.), Dry fiber material of Kevlar® (E.I. du Pont de Nemours and Company, Midland, Mich.) or carbon fiber, and composite material made with Kevlar® (E.I. du Pont de Nemours and Company, Midland, Mich.) or carbon fiber Referring now to FIG. 8, the frame 118 fits within the cavity 126 of the bottom shell 108 with portions of the frame 118 abutting the side of the bottom shell 108. As noted above, the curved profiles CP1, CP2, and CP3 of the housing case 102, interior ballistic panel 116, and frame 118, respectively, align within one another to allow the interior ballistic panel 116, the flexible backplane system 200, and the frame 118 to nest within the housing case 102. In some embodiments, the interior ballistic panel 116 is not arranged within the housing case 102.

Figure 9:
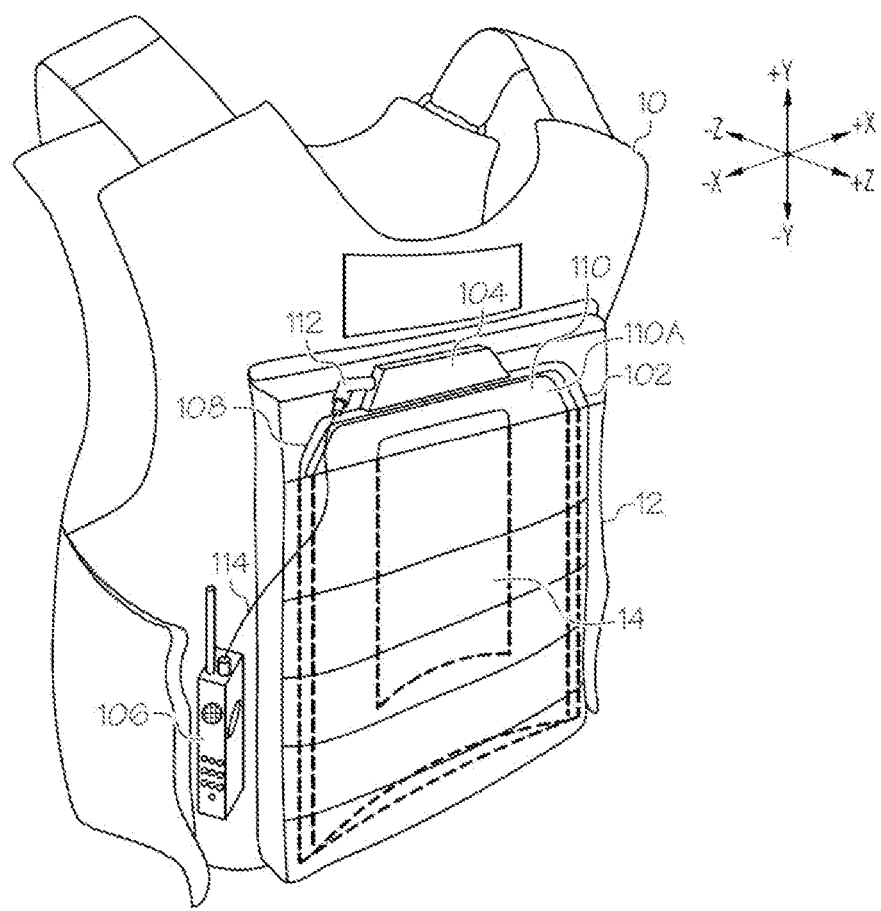
FIG. 9 schematically depicts the armor system of FIG. 1 arranged within a carrier vest, according to one or more embodiments shown or described herein.

Referring now to FIG. 9, the armor system 100 may be used in combination with a carrier vest 10. The carrier vest 10 includes a ballistic panel holding 12, which is sized to hold the armor system 100 in the correct position on a user's body. Additionally, am exterior ballistic panel 14 may be secured to an external face 110A of the housing case 102 to provide additional ballistic protection. In some embodiments and exterior ballistic panel 14 is not required. Additionally, armor system 100 may be connected to an external device 106 via external connector 104, socket 112, and flexible power cable 114. Additionally, the housing case 102 may further include hook and loop fasteners on the exterior of the housing case to secure the armor system 100 to a user or a carrier vest 10.

It should now be understood that embodiments described herein are directed to an armor system that generally includes a housing case, an interior ballistic panel, a frame, a flexible backplane system, an electrical energy storage unit, and a control unit. The housing case includes a top shell and a bottom shell, where the top shell is removably secured to the bottom shell, forming a cavity. The interior ballistic panel is removably arranged within the cavity between the top shell and the bottom shell. The frame is arranged within the cavity between the top shell and the flexible backplane system, the frame including a compartment. The flexible backplane system is arranged within the cavity between the frame and the bottom shell. The electrical energy storage unit is arranged within the compartment of the frame, and the control unit is communicatively connected to the electrical energy storage unit to manage operation of the electrical energy storage unit. The interior ballistic panel, frame, flexible backplane system, and electrical energy storage unit may be easily removed from the cavity of the housing case. For example, the interior ballistic panel could be removed if additional ballistics protection is not required beyond the level of ballistic protection of the housing case. Accordingly, the interior ballistic panel can replaced with a different ballistic protection panel, form a small arms protective panel, to a soft Kevlar® (E.I. du Pont de Nemours and Company, Midland, Mich.) insert.

Having described the ballistic nature of the armor system 100, it will be apparent to those skilled in the art that the teachings gleaned from a garment merely having an electrified component are not readily transferable to the articles of the present disclosure. Specifically, the armor system 100 is for deployment in a scenario where it can be expected that the armor system 100, and more specifically the housing case 102, will be subjected to damage and/or impact from gunfire and/or shrapnel. As a garment merely having an electrified component is not subject to such working environment and not subject to expected in-service damage, the general or generic disclosures provided by such garments are not expected by one skilled in the art to be applicable or readily transferable to the presently disclosed armor system 100.

Based on the foregoing, it should now be understood that various aspects of an armor system are disclosed herein.

According to a first aspect of the present disclosure, an armor system comprises: a ballistic housing case, comprising: a top shell and a bottom shell, wherein the top shell is removably secured to the bottom shell, forming a cavity; a frame which is rigid and non-electrically conductive arranged within the cavity between the top shell and the bottom shell, the frame comprising a compartment; an electrical energy storage unit arranged within the compartment of the frame such that the electrical energy storage unit is fully within the ballistic housing case; a control unit communicatively connected to the electrical energy storage unit to manage operation of the electrical energy storage unit; and a flexible backplane system comprising electrical connectors and electrical traces on a flexible substrate connecting the electrical energy storage unit to the control unit.

A second aspect includes the armor system of the first aspect, in which the system further comprises an interior ballistic panel removably arranged within the cavity between the top shell and the bottom shell.

A third aspect includes the armor system of the first or second aspect, in which the frame further comprises a plurality of compartments formed by a plurality of perpendicularly arranged ribs forming the frame.

A fourth aspect includes the armor system of the third aspect, in which the control unit is arranged within at least one compartment of the frame.

A fifth aspect includes the armor system of any of the first through fourth aspects, in which the electrical energy storage unit is a plurality of batteries each of the plurality of batteries individually connected to one of the electrical connectors of the flexible backplane system.

A sixth aspect includes the armor system of the fifth aspect, in which the flexible backplane system further comprises at least one fuse communicatively connected between the control unit and the plurality of batteries.

A seventh aspect includes the armor system of the fifth aspect, in which the flexible backplane system further comprises at least one temperature sensor positioned proximal the plurality of batteries and communicatively connected to the control unit to measure an operating temperature of one or more of the plurality of batteries.

An eighth aspect includes the armor system of the fifth aspect, in which the flexible backplane system further comprises at least one fuse communicatively connected between the control unit and each of the plurality of batteries independently and at least one temperature sensor positioned proximal each of the plurality of batteries and communicatively connected to the control unit to measure an operating temperature of each of the plurality of batteries independently.

A ninth aspect includes the armor system of any of the fifth through eighth aspects, in which the plurality of batteries is arranged within corresponding compartments of the plurality of compartments of the frame.

A tenth aspect includes the armor system of any of the fifth through ninth aspects, in which the system further comprises an external connector passing through the housing case and communicatively connected to the plurality of batteries and the control unit allowing current to be transmitted from the plurality of batteries to an external device.

An eleventh aspect includes the armor system of any of the second through tenth aspects, in which the flexible backplane system is disposed between the electrical energy storage unit and the ballistic panel.

A twelfth aspect includes the armor system of any of the first through eleventh aspects, in which the ballistic housing case is formed from a fiber-reinforced composite material comprising reinforcement material and a polymer.

According to a thirteenth aspect of the present disclosure, an armor system comprises a housing case comprising a top shell and a bottom shell, wherein the top shell is removably secured to the bottom shell, forming a cavity; an interior ballistic panel removably arranged within the cavity between the top shell and the bottom shell; a plurality of longitudinally arranged ribs arranged within the cavity; a plurality of latitudinally arranged ribs arranged over the plurality of longitudinally arranged ribs, wherein the plurality of longitudinally arranged ribs are secured to or integral with the plurality of latitudinally arranged ribs, forming a plurality of compartments; an electrical energy storage unit arranged within at least one of the plurality of compartments such that the electrical energy storage unit is fully within the housing case; a control unit arranged within at least one of the plurality of compartments and communicatively connected to the electrical energy storage unit to manage operation of the electrical energy storage unit; and a flexible backplane system comprising electrical connectors and electrical traces on a flexible substrate connecting the electrical energy storage unit to the control unit, wherein the flexible backplane system is disposed between the electrical energy storage unit and the interior ballistic panel.

A fourteenth aspect includes the armor system of the thirteenth aspect, in which the plurality of longitudinally arranged ribs and the plurality of latitudinally arranged ribs are integral with one another to form a frame.

A fifteenth aspect includes the armor system of the thirteenth or fourteenth aspect, in which the electrical energy storage unit is a plurality of batteries each of the plurality of batteries individually connected to one of the electrical connectors of the flexible backplane system.

A sixteenth aspect includes the armor system of the fifteenth aspect, in which the flexible backplane system further comprises at least one fuse communicatively connected between the control unit and the plurality of batteries.

A seventeenth aspect includes the armor system of the fifteenth aspect, in which the flexible backplane system further comprises at least one temperature sensor positioned proximal the plurality of batteries and communicatively connected to the control unit to measure an operating temperature of one or more of the plurality of batteries.

An eighteenth aspect includes the armor system of the fifteenth aspect, in which the flexible backplane system further comprises a plurality of fuses communicatively connected between the control unit and the plurality of batteries, wherein each of the plurality of fuses is paired with a separate grouping of the plurality of batteries; and at least one temperature sensor positioned proximal each grouping of the plurality of batteries and communicatively connected to the control unit to measure an operating temperature of each grouping of the plurality of batteries separately; wherein each grouping of the plurality of batteries may comprise from one to all of the plurality of batteries.

A nineteenth aspect includes the armor system of the fifteenth aspect, in which the flexible backplane system further comprises at least one fuse communicatively connected between the control unit and each of the plurality of batteries independently; and at least one temperature sensor positioned proximal each of the plurality of batteries and communicatively connected to the control unit to measure an operating temperature of each of the plurality of batteries independently.

A twentieth aspect includes the armor system of any of the fifteenth through nineteenth aspects, in which the system further comprises an external connector passing through the housing case and communicatively connected to the plurality of batteries and the control unit allowing current to be transmitted from the plurality of batteries to an external device.

A twenty-first aspect includes the armor system of any of the thirteenth through twentieth aspects, in which the housing case is formed from a fiber-reinforced composite material comprising reinforcement material and a polymer.

The singular forms "a", "an" and "the" include plural referents, unless the context clearly dictates otherwise.

It is further noted that spatially oriented terms like "top", "bottom," and similar are not utilized herein to limit the scope of the claimed invention or to imply that certain special orientations are critical, essential, or even important to the structure or function of the claimed invention. Rather, these terms are merely intended to provide relative positions of components in a commonly understood manner.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:
1. An armor system, comprising:
 a ballistic housing case, comprising:
  a top shell; and
  a bottom shell;
  wherein the top shell is removably secured to the bottom shell, forming a cavity;
 a frame which is rigid and non-electrically conductive arranged within the cavity between the top shell and the bottom shell, the frame comprising a compartment;

an electrical energy storage unit arranged within the compartment of the frame such that the electrical energy storage unit is fully within the ballistic housing case;

a control unit communicatively connected to the electrical energy storage unit to manage operation of the electrical energy storage unit; and a flexible backplane system comprising electrical connectors and electrical traces on a flexible substrate connecting the electrical energy storage unit to the control unit.

2. The armor system of claim 1, wherein the system further comprises an interior ballistic panel removably arranged within the cavity between the top shell and the bottom shell.

3. The armor system of claim 2, wherein the flexible backplane system is disposed between the electrical energy storage unit and the ballistic panel.

4. The armor system of claim 1, wherein the frame further comprises a plurality of compartments formed by a plurality of perpendicularly arranged ribs forming the frame.

5. The armor system of claim 4, wherein the control unit is arranged within at least one compartment of the frame.

6. The armor system of claim 1, wherein the electrical energy storage unit is a plurality of batteries each of the plurality of batteries individually connected to one of the electrical connectors of the flexible backplane system.

7. The armor system of claim 6, wherein the flexible backplane system further comprises at least one fuse communicatively connected between the control unit and the plurality of batteries.

8. The armor system of claim 6, wherein the flexible backplane system further comprises at least one temperature sensor positioned proximal the plurality of batteries and communicatively connected to the control unit to measure an operating temperature of one or more of the plurality of batteries.

9. The armor system of claim 6, wherein the flexible backplane system further comprises
at least one fuse communicatively connected between the control unit and each of the plurality of batteries independently; and
at least one temperature sensor positioned proximal each of the plurality of batteries and communicatively connected to the control unit to measure an operating temperature of each of the plurality of batteries independently.

10. The armor system of claim 6, wherein the plurality of batteries is arranged within corresponding compartments of the plurality of compartments of the frame.

11. The armor system of claim 6, further comprising an external connector passing through the housing case and communicatively connected to the plurality of batteries and the control unit allowing current to be transmitted from the plurality of batteries to an external device.

12. The armor system of claim 1, wherein the ballistic housing case is formed from a fiber-reinforced composite material comprising reinforcement material and a polymer.

13. An armor system, comprising:
a housing case, comprising:
a top shell; and
a bottom shell;
wherein the top shell is removably secured to the bottom shell, forming a cavity;

an interior ballistic panel removably arranged within the cavity between the top shell and the bottom shell;

a plurality of longitudinally arranged ribs arranged within the cavity;

a plurality of latitudinally arranged ribs arranged over the plurality of longitudinally arranged ribs, wherein the plurality of longitudinally arranged ribs are secured to or integral with the plurality of latitudinally arranged ribs, forming a plurality of compartments;

an electrical energy storage unit arranged within at least one of the plurality of compartments such that the electrical energy storage unit is fully within the housing case;

a control unit arranged within at least one of the plurality of compartments and communicatively connected to the electrical energy storage unit to manage operation of the electrical energy storage unit; and a flexible backplane system comprising electrical connectors and electrical traces on a flexible substrate connecting the electrical energy storage unit to the control unit, wherein the flexible backplane system is disposed between the electrical energy storage unit and the interior ballistic panel.

14. The armor system of claim 13, wherein the plurality of longitudinally arranged ribs and the plurality of latitudinally arranged ribs are integral with one another to form a frame.

15. The armor system of claim 13, wherein the electrical energy storage unit is a plurality of batteries each of the plurality of batteries individually connected to one of the electrical connectors of the flexible backplane system.

16. The armor system of claim 15, wherein the flexible backplane system further comprises at least one fuse communicatively connected between the control unit and the plurality of batteries.

17. The armor system of claim 15, wherein the flexible backplane system further comprises at least one temperature sensor positioned proximal the plurality of batteries and communicatively connected to the control unit to measure an operating temperature of one or more of the plurality of batteries.

18. The armor system of claim 15, wherein the flexible backplane system further comprises:
a plurality of fuses communicatively connected between the control unit and the plurality of batteries, wherein each of the plurality of fuses is paired with a separate grouping of the plurality of batteries; and
at least one temperature sensor positioned proximal each grouping of the plurality of batteries and communicatively connected to the control unit to measure an operating temperature of each grouping of the plurality of batteries separately;
wherein each grouping of the plurality of batteries may comprise from one to all of the plurality of batteries.

19. The armor system of claim 15, further comprising an external connector passing through the housing case and communicatively connected to the plurality of batteries and the control unit allowing current to be transmitted from the plurality of batteries to an external device.

20. The armor system of claim 13, wherein the housing case is formed from a fiber-reinforced composite material comprising reinforcement material and a polymer.

* * * * *